United States Patent
Menzel et al.

(10) Patent No.: US 8,361,201 B2
(45) Date of Patent: Jan. 29, 2013

(54) METHODS FOR DEPLETING HYDROGEN SULFIDE IN NATURAL GAS FROM THE EXPLOITATION OF CRUDE OIL/NATURAL GAS MIXTURES

(75) Inventors: Johannes Menzel, Waltrop (DE); Georg Saecker, Dortmund (DE)

(73) Assignee: UHDE GmbH, Dortmund (DE)

( * ) Notice: Subject to any disclaimer, the term of this patent is extended or adjusted under 35 U.S.C. 154(b) by 762 days.

(21) Appl. No.: 11/921,197

(22) PCT Filed: May 24, 2006

(86) PCT No.: PCT/EP2006/004917
§ 371 (c)(1),
(2), (4) Date: Sep. 28, 2009

(87) PCT Pub. No.: WO2006/128619
PCT Pub. Date: Jul. 12, 2006

(65) Prior Publication Data
US 2010/0011957 A1 Jan. 21, 2010

(30) Foreign Application Priority Data
Jun. 3, 2005 (DE) .......................... 10 2005 025 958

(51) Int. Cl.
*B01D 53/14* (2006.01)
(52) U.S. Cl. ................ 95/158; 95/172; 95/176; 95/177; 95/192; 95/208; 95/235
(58) Field of Classification Search .................. None
See application file for complete search history.

(56) References Cited

U.S. PATENT DOCUMENTS

| | | | | |
|---|---|---|---|---|
| 4,124,496 A * | 11/1978 | Cummings | .................. | 208/361 |
| 4,276,057 A | 6/1981 | Becker et al. | | |
| 6,102,987 A * | 8/2000 | Gross et al. | ...................... | 95/172 |
| 6,342,091 B1 * | 1/2002 | Menzel et al. | .................. | 95/167 |
| 7,276,153 B2 * | 10/2007 | Wagner et al. | ................. | 208/240 |

(Continued)

FOREIGN PATENT DOCUMENTS

| | | |
|---|---|---|
| AT | 331 746 B | 8/1976 |
| DE | 197 53 903 C2 | 4/2002 |
| DE | 103 24 694 A1 | 12/2004 |

(Continued)

*Primary Examiner* — Duane Smith
*Assistant Examiner* — Pankti Patel
(74) *Attorney, Agent, or Firm* — Marshall & Melhorn, LLC

(57) ABSTRACT

The hydrogen sulphide content of natural gas obtained from the extraction of sour-gas containing crude oil/ natural gas mixtures, is reduced by reducing the high pressure of a raw crude oil/ natural gas mixture to 70-130 bar, separating an outgassing raw gas from the crude oil, cooling the outgassed raw gas and simultaneously drawing off a liquid medium which condenses from the outgassing raw gas during cooling. The outgassed raw gas is subjected, after pressure reduction, to gas scrubbing by a physically active solvent. The laden solvent is directed to at least one pressure reduction step to obtain $H_2S$ outgas from the solvent. The pressure of the crude oil is further reduced in two subsequent steps to 20-40 bar and 2-15 bar and additional $H_2S$ rich raw gas streams are separated from the crude oil which outgas therefrom. The $H_2S$ containing gas outgassed from the solvent is brought to the same pressure as the $H_2S$ rich raw gases outgassed from the crude oil and all outgassed $H_2S$ containing streams are combined and brought to a pressure above that of the crude oil reservoir and fed into a well in the reservoir.

12 Claims, 1 Drawing Sheet

U.S. PATENT DOCUMENTS

| | | | |
|---|---|---|---|
| 7,674,321 B2 * | 3/2010 | Menzel | 95/177 |
| 7,674,325 B2 * | 3/2010 | Won | 96/234 |
| 2005/0172807 A1 * | 8/2005 | Mak | 95/235 |
| 2007/0006731 A1 | 1/2007 | Menzel | |
| 2007/0175796 A1 * | 8/2007 | Mock | 208/208 R |
| 2007/0187340 A1 | 8/2007 | Oresti et al. | |

FOREIGN PATENT DOCUMENTS

| | | |
|---|---|---|
| EP | 0 920 901 B1 | 6/1999 |
| WO | WO 02/063135 A1 | 8/2002 |
| WO | WO 2004/052511 A1 | 6/2004 |
| WO | WO 2005/094961 A1 | 10/2005 |

* cited by examiner

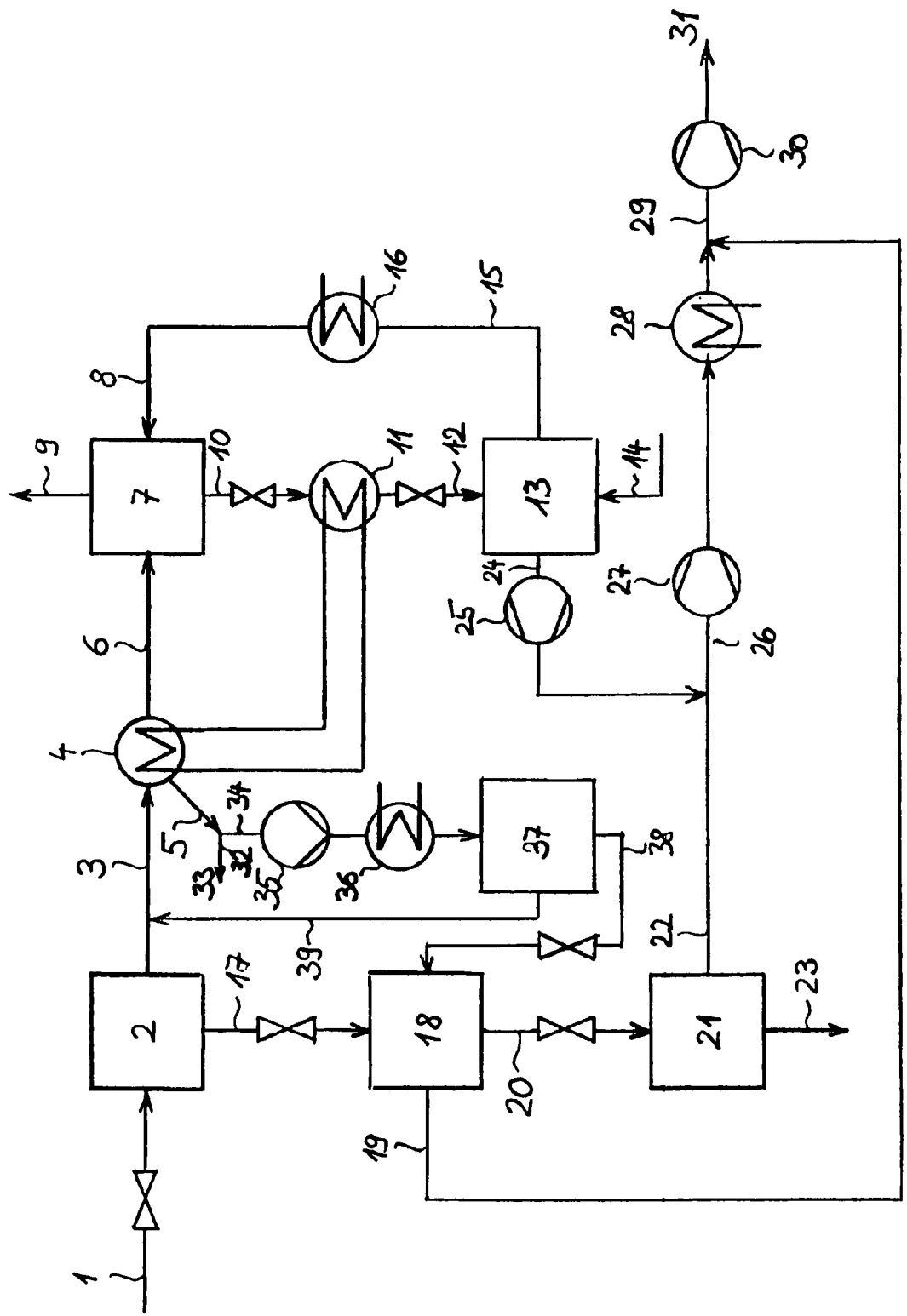

METHODS FOR DEPLETING HYDROGEN SULFIDE IN NATURAL GAS FROM THE EXPLOITATION OF CRUDE OIL/NATURAL GAS MIXTURES

BACKGROUND OF THE INVENTION

The invention relates to a process for reducing hydrogen sulphide in natural gas. When crude oil is extracted, it occasionally comprises large amounts of natural gas. This natural gas may contain a significant amount of hydrogen sulphide ($H_2S$), the $H_2S$ content often exceeding 5% and in some cases even 20%—in both cases in relation to volume under standard conditions. This raw gas is dissolved in the crude oil under the high pressure prevailing in oilfields. During extraction, subsequent transportation and refining of the crude oil, this raw gas outgases from the crude oil.

The high $H_2S$ content of the raw gas poses a problem, particularly with regard to safety: $H_2S$ is a highly poisonous respiratory toxin for humans, animals and plants. In the event of a leak or accident the usually high volumetric flow rates from a well could quickly lead to such a substantial amount of highly toxic $H_2S$ being released into the surroundings as to pose a considerable threat of harm to workers and the environment and oil extraction would have to be stopped immediately.

This is an even greater problem when oil extraction is located on an oil platform and the quick evacuation of all personnel in an emergency cannot always be guaranteed. In view of the rough conditions at sea, any process offering a solution should therefore be extremely robust and also space-saving.

Another problem is what to do with the $H_2S$. Admittedly, it could be processed into sulphur dioxide, sulphur and sulphuric acid using a common process. This would however entail immense costs if done on site and, if this were not possible, transport problems would arise.

BRIEF SUMMARY OF THE INVENTION

Hence, the purpose of the invention is to provide a safe and particularly compact process which allows a substantial reduction in the $H_2S$ content of natural gas at the place of extraction, while at the same time offering a safe and robust design and furthermore ensuring that the $H_2S$ is dealt with safely.

The invention achieves this purpose as stated in the main claim by
- first reducing the high pressure the raw crude oil/natural gas mixture is under to between 70 and 130 bar—preferably 90 bar
- separating the outgassing raw gas from the crude oil and cooling said gas
- at the same time drawing off the liquid medium as it condenses during said cooling
- following said cooling and without any further action to reduce the pressure, subjecting the outgassed raw gas to gas scrubbing, which absorbs a large part of the $H_2S$ contained in the raw gas by means of a physically active solvent, thus cleaning the raw gas
- directing the laden solvent to at least one pressure reduction step
- feeding the heat given off during the cooling of the raw gas to the laden solvent
- letting the dissolved $H_2S$ outgas from the solvent
- cooling the solvent thus regenerated and returning it to the gas scrubber
- further reducing the pressure of the crude oil from 70-130 bar to 20-40 bar—preferably 30 bar—in a subsequent step and separating the additional $H_2S$-rich raw gas from the crude oil as it outgases therefrom
- again reducing the pressure of the crude oil from 20-40 bar to 2-15 bar—preferably 10 bar—and separating the additional raw gas from the crude oil as it outgases therefrom
- bringing the $H_2S$-containing gas outgassed from the solvent to the same pressure as the $H_2S$-rich raw gas outgassed from the crude oil and combining all outgassed $H_2S$-containing gas streams
- bringing this combined $H_2S$-containing gas stream to a pressure above that of the crude oil reservoir and feeding it into a well in said crude oil reservoir.

In this way a large part of the $H_2S$ extracted is used to maintain the discharge pressure of the crude oil reservoir, which improves the possible overall oil and gas yields. However, it should be borne in mind that in the long term returning this gas leads to an accumulation of $H_2S$ in the raw gas extracted from said crude oil reservoir.

It is therefore all the more important that the described process also ensures the safe, economical processing of very high concentrations of $H_2S$ by simply allowing a higher percentage of the liquid medium which condenses as the raw gas is cooled, thereby absorbing a large part of the $H_2S$ contained in the raw gas, to be drawn off in line with the increased $H_2S$ content in the raw gas. This is one advantage of said invention. There are a range of alternatives for utilising the liquid medium, and these may be used alternately or cumulatively in the case of a continuous rise in the $H_2S$ content.

One embodiment of the process according to the invention therefore envisages pumping the liquid medium drawn off after cooling the raw gas into a well in the crude crude oil reservoir.

In a second embodiment of the process according to the invention, the pressure of the condensed liquid medium is reduced to the same pressure as the crude oil, i.e. between 20-40 bar and preferably 30 bar, at the same time combining the gas medium formed with the gas medium outgassing from the crude oil and combining the remaining liquid medium with the crude oil. In practice, this can be done by expanding both the crude oil and the drawn off liquid medium into the same evaporation drum.

In a third embodiment of the process according to the invention, the liquid medium which condenses during the cooling of the raw gas outgassed from the crude oil is subjected to throttling, causing it to evaporate completely and cool in accordance with the Joule-Thomson effect—the resulting cold being used to cool the regenerated solvent and the $H_2S$-containing gas stream being combined with the other $H_2S$-containing gas streams after compression.

The liquid medium which condenses out can first be treated to enrich its $H_2S$ content before being subjected to the above. A further embodiment of the process according to the invention therefore envisages using a pump to slightly increase the pressure of the liquid medium drawn off after cooling the raw gas, feeding this liquid medium to a preheater to be heated to approximately 70° C.—which creates a two-medium system with the release of mainly volatile hydrocarbons as the gas medium—then returning this gas medium to the raw gas upstream of the raw gas cooler, achieving an accordingly enriched $H_2S$ content of the remaining liquid medium.

Here, the slight pressure increase need only be enough to compensate for the pressure losses which occur so that the gas medium formed can be returned upstream of the raw gas cooler. It may also be appropriate to cool the remaining liquid medium—the heat, at least partly, being released in an internal heat exchange process to the medium drawn off after the cooling of the raw gas. This is particularly true if the liquid medium is to be subsequently used to generate cold.

To improve solvent regeneration an additional regeneration step based on pressure reductions may be included, as envisaged in European patent specification 0 920 901 B1. In a further embodiment of the process according to the invention the final solvent pressure reduction step is designed and operated as a low-pressure stripping column and purified natural gas is used as the stripping gas.

The simultaneous absorption of higher hydrocarbons cannot always be avoided when a physical solvent is used. These useful components, which are also separated out are, according to the invention, returned to the crude oil reservoir for the moment along with the $H_2S$. As soon as the accumulation of $H_2S$ in the crude oil reservoir leads to an increased $H_2S$ concentration in the $H_2S$ scrubbing stage, the hydrocarbons are however adsorptively displaced by the more easily absorbed $H_2S$ and an ever greater percentage of higher hydrocarbons gets into the pre-purified natural gas. Consequently, these hydrocarbons are not lost on a long-term basis; it is just that they tend to be exploited at a later date.

In a further embodiment of the process according to the invention a mixture of N-formylmorpholine (NFM) and N-acetylmorpholine (NAM) is used as solvent, as described in European patent specification 0 920 901 B1. The sour gas scrubbing process can be used in a similar manner as described therein but a high standard of product gas purity and thus regeneration of the solvent cannot be expected. A suitable location for use is for example an oil platform.

Compared with other methods, a scrubbing process using a physical solvent has the advantage that it requires only a very small circulation loop for the scrubbing agent and can be built very compactly. Sensitive parts, such as thin membranes, etcetera, are not used. The use of pressure reduction devices to regenerate the solvent obviates the need for external regeneration energy, such as steam, thus enabling an even more compact design, which is an advantage of the invention.

BRIEF DESCRIPTION OF THE DRAWINGS

The FIGURE illustrates an embodiment of the present invention.

DETAILED DESCRIPTION OF THE INVENTION

The invention is explained in greater detail below by means of an example design. At the same time, the Figure shows a block diagram of the process installed on an oil platform—the valves illustrated representing pressure reduction devices which, however, could alternatively be designed as reverse rotation pumps and compressors (expanders).

The pressure of the warm crude oil/raw gas mixture (1) extracted from the crude oil reservoir is reduced from approximately 800 to 95 bar in the high-pressure separator (2), where two media are formed during cooling—a liquid crude oil medium and a gaseous raw gas medium. These two media are separated in the high-pressure separator (2). The gas medium is cooled as raw gas (3) to approximately 10° C. in the raw gas cooler (4), which may also be of a multi-stage design. During cooling a liquid medium (5) condenses out. The cooled raw gas (6) is then scrubbed in the scrubber (7) using the scrubbing agent (8), with most of the $H_2S$ present in the raw gas being absorbed in the scrubbing agent. The pre-treated natural gas (9) leaves the scrubber (7) and is conveyed via a pipeline to an external natural gas treatment station, where on-spec. natural gas is produced.

The pressure of the saturated $H_2S$-laden scrubbing agent (10) is reduced in several steps and at the same time heated in the heater (11) connected to the cooler (4), thus reducing the solubility of the $H_2S$, allowing a particularly large amount of $H_2S$ to be stripped at ambient pressure in an advantageous manner from the heated scrubbing agent (12) in the low-pressure stripping column (13) by means of at least partially purified natural gas (14), which can, for example, be drawn off from the pre-treated natural gas (9). The stripped scrubbing agent (15) is cooled to use temperature in the scrubbing agent cooler (16) and returned to the scrubber (7).

The pressure of the high-pressure crude oil (17) recovered from the high-pressure separator (2) is reduced to 30 bar in the medium-pressure separator (18), where additional dissolved gas components outgas from the crude oil and are drawn off as medium-pressure raw gas (19).

The pressure of the medium-pressure crude oil (20) removed from the medium-pressure separator (18) is further reduced to 9 bar in the low-pressure separator (21), where additional dissolved gas components again outgas from the crude oil and are drawn off as low-pressure raw gas (22). The low-pressure crude oil (23) from the low-pressure separator (21) is conveyed via a pipeline or by ship to an external refinery, where it is further refined.

The off-gas (24) leaving the low-pressure stripping column (13) is compressed to the pressure of the low-pressure raw gas in the off-gas compressor (25) and combined with the low-pressure raw gas (22). If—not shown here—any other $H_2S$-containing gas streams to which the saturated scrubbing agent or expanded, evaporated condensate (5) is subjected occur, for instance downstream of the pressure reduction devices, these streams can also be integrated at this point, or upstream of the off-gas compressor (24) if their pressure is otherwise not sufficient.

The low-pressure sour gas (26) is brought to the pressure level of the medium-pressure separator (18) in the low-pressure compressor (27) and, after being cooled in the medium-pressure cooler (28), combined with the medium-pressure raw gas (19). The combined medium-pressure sour gas (29) is then compressed to reservoir pressure in the high-pressure compressor (30) and fed into the crude oil reservoir (31).

After being cooled in the raw gas cooler (4) to approximately 10° C., the condensed liquid medium (5) is separated into two part streams. One of the part streams (32) is pumped to the crude oil reservoir (33)—the pumps are, however, not shown in the diagram. The pressure of the other part stream (34) is slightly raised by means of the delivery pump (35) and heated to 70° C. in the heater (36).

The outgassing gas medium and the remaining liquid medium are separated from each other in the media separation unit (37). The pressure of the liquid medium (38) is reduced to the pressure in the medium-pressure separator (18) and fed into this separator (18). The gas medium (39) is mixed with the raw gas (3).

Consequently, of the original $H_2S$ content of the crude oil/raw gas mixture (1), approximately 83% remains in the crude oil reservoir (31), approximately 10% in the pre-treated raw gas (8) and approximately 7% in the crude oil, resulting in a significant reduction in the risks of environmental damage and hazards.

LIST OF REFERENCE NUMBERS

1 Crude oil/raw gas mixture
2 High-pressure separator
3 Raw gas
4 Raw gas cooler
5 Condensate
6 Cooled raw gas
7 Scrubber
8 Scrubbing agent
9 Pre-treated natural gas
10 Saturated scrubbing agent
11 Heater
12 Heated scrubbing agent
13 Low-pressure stripping column
14 Stripping gas
15 Stripped scrubbing agent
16 Scrubbing agent cooler
17 High-pressure crude oil
18 Medium-pressure separator
19 Medium-pressure raw gas
20 Medium-pressure crude oil
21 Low-pressure separator
22 Low-pressure raw gas
23 Low-pressure crude oil
24 $H_2S$ off-gas
25 Off-gas compressor
26 Low-pressure sour gas
27 Low-pressure compressor
28 Low-pressure cooler
29 Medium-pressure gas
30 High-pressure compressor
31 Crude oil reservoir
32 Part stream
33 Crude oil reservoir
34 Part stream
35 Delivery pump
36 Heater
37 Media separation unit
38 Liquid medium
39 Gas medium

The invention claimed is:

1. A process for reducing the hydrogen sulphide content of natural gas obtained during the extraction of sour gas-containing crude oil/natural gas mixtures, by
   first reducing the high pressure the raw crude oil/natural gas mixture is under to between 70 and 130 bar
   separating an outgassing raw gas from the crude oil and cooling said raw gas
   at the same time drawing off the liquid medium as it condenses during said cooling
   following said cooling and without any further action to reduce the pressure, subjecting the outgassed raw gas to gas scrubbing, which absorbs a large part of the $H_2S$ contained in the raw gas by means of a physically active solvent, thus cleaning the raw gas and dissolving $H_2S$ in the solvent yeilding a laden solvent
   directing the laden solvent to at least one pressure reduction step
   feeding the heat given off during the cooling of the raw gas to the laden solvent
   letting the dissolved $H_2S$ outgas from the solvent
   cooling the solvent thus regenerated and returning it to the gas scrubber
   further reducing the pressure of the crude oil from 70-130 bar to 20-40 bar in a subsequent step and separating an additional $H_2S$-rich raw gas from the crude oil as it outgases therefrom
   again reducing the pressure of the crude oil from 20-40 bar to 2-15 bar and separating a further additional $H_2S$-rich raw gas from the crude oil as it outgases therefrom
   bringing the $H_2S$-containing gas outgassed from the solvent to the same pressure as the $H_2S$-rich raw gas outgassed from the crude oil and combining all outgassed $H_2S$-containing gas streams
   bringing this combined $H_2S$-containing gas stream to a pressure above that of the crude oil reservoir and feeding it into a well in said reservoir.

2. The process according to claim 1, wherein the liquid medium drawn off after the raw gas has cooled is pumped into a well in the crude oil reservoir.

3. The process according to claim 1, wherein the pressure of the condensed liquid medium is reduced to the same level as that of the crude oil, namely 20-40 bar and the gas medium thus formed is combined with the gas medium outgassing from the crude oil and the remaining liquid medium combined with the crude oil.

4. The process according to claim 1, wherein the liquid medium obtained from cooling the raw gas is subjected to throttling, during which it evaporates and cools in accordance with the Joule-Thomson effect —the resulting cold being used to cool the regenerated solvent and the $H_2S$-containing gas stream being combined with the other $H_2S$-containing gas streams following compression.

5. The process according to claim 1, wherein the liquid medium drawn off after cooling the raw gas is first subjected to a slight pressure increase by means of a pump before being fed to a preheater, where a two-medium system forms with the release of mainly readily volatile hydrocarbons as the gas medium, this gas medium being returned to the raw gas upstream of the raw gas cooler, achieving an accordingly enriched $H_2S$ content of the remaining liquid medium.

6. The process according to claim 5, wherein the remaining liquid medium is cooled —the heat, at least partly, being released to the medium drawn off after the cooling of the raw gas.

7. The process according to claim 1, wherein the final solvent pressure reduction step is designed and operated as a low-pressure stripping column and purified natural gas is used as the stripping gas.

8. The process according to claim 1, wherein a mixture of N-formylmorpholine and N-acetylmorpholine is used as solvent.

9. The process according to claim 1, wherein the step of reducing the high pressure the raw crude oil/natural gas mixture is under comprises reducing the pressure to about 90 bar.

10. The process according to claim 1, wherein the step of further reducing the pressure of the crude oil from 70-130 bar to 20-40 bar comprises reducing the pressure to about 30 bar.

11. The process according to claim 1, wherein the step of again reducing the pressure of the crude oil from 20-40 bar to 2-15 bar comprises reducing the pressure to about 10 bar.

12. The process according to claim 3, wherein the pressure of the condensed liquid is reduced to about 30 bar.

* * * * *

UNITED STATES PATENT AND TRADEMARK OFFICE
CERTIFICATE OF CORRECTION

PATENT NO. : 8,361,201 B2
APPLICATION NO. : 11/921197
DATED : January 29, 2013
INVENTOR(S) : Menzel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1426 days.

Signed and Sealed this
First Day of September, 2015

Michelle K. Lee
*Director of the United States Patent and Trademark Office*